(12) United States Patent
Zhu et al.

(10) Patent No.: US 8,180,498 B2
(45) Date of Patent: May 15, 2012

(54) SYSTEM AND METHOD FOR MONITORING AND CONTROLLING A WIND TURBINE FARM

(75) Inventors: Wei Zhu, ShangHai (CN); Vasant Raj, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/972,747

(22) Filed: Dec. 20, 2010

(65) Prior Publication Data

US 2011/0160925 A1 Jun. 30, 2011

(30) Foreign Application Priority Data

Dec. 25, 2009 (CN) .......................... 2009 1 0262639

(51) Int. Cl.
*G05D 17/00* (2006.01)
*H02P 9/04* (2006.01)
(52) U.S. Cl. ............................. 700/287; 290/44; 700/83

(58) Field of Classification Search ................... 700/286, 700/287, 83; 290/44, 55; 416/61; 702/3, 702/1
See application file for complete search history.

(56) References Cited

U.S. PATENT DOCUMENTS

| 4,155,252 | A * | 5/1979 | Morrill | 73/170.08 |
| 6,925,385 | B2 * | 8/2005 | Ghosh et al. | 702/14 |
| 6,966,754 | B2 * | 11/2005 | Wobben | 416/61 |
| 7,013,203 | B2 | 3/2006 | Moore et al. | |
| 2004/0021687 | A1 | 2/2004 | Wobben | |
| 2005/0033481 | A1 * | 2/2005 | Budhraja et al. | 700/286 |
| 2006/0279423 | A1 * | 12/2006 | Nazari | 340/541 |

* cited by examiner

*Primary Examiner* — Albert Decady
*Assistant Examiner* — Steven Garland
(74) *Attorney, Agent, or Firm* — McNees Wallace & Nurick LLC

(57) ABSTRACT

A system and method for operating a plurality of wind turbines includes a supervisory control and data acquisition (SCADA) system and a display for depicting a graphical output of information from the SCADA system. The SCADA system analyzes the information and transmits a signal to the display to visually depict the information in a dynamic manner.

9 Claims, 5 Drawing Sheets

SYSTEM AND METHOD FOR MONITORING AND CONTROLLING A WIND TURBINE FARM

FIELD OF THE INVENTION

The present disclosure is directed to a system and method for monitoring and controlling the operation of a wind turbine or wind turbines, and specifically to a system or method for dynamically displaying performance-related information for a wind turbine or wind turbines.

BACKGROUND OF THE INVENTION

In recent years, reliance upon wind as a source of energy has grown. As reliance upon wind as a source of energy continues to grows, increased efficiency of wind turbines and wind turbine farms increases in importance.

Generally, a wind turbine converts wind energy into rotational energy, and more specifically, converts kinetic energy of wind into mechanical energy. The mechanical energy is used for producing electrical power. Wind turbines may include a rotor having multiple blades that rotate in response to force provided by the wind. Upon rotating the multiple blades, a drive shaft rotates, which in turn drives an electrical generator to generate the electrical power.

A wind farm is a group of interconnected wind turbines at a location. The location of the wind farm may consist of two wind turbines to hundreds of wind turbines. The location of the wind farm may cover a small area of hundreds of square yards (square meters) to an extended area of hundreds of square miles (square kilometers). The location of the wind farm may be located off-shore or near-shore, typically selected so as to increase the energy of the wind. The location may be selected to increase the energy generated by the wind.

Wind turbines and wind farms can be monitored by a computer system, for example, a Supervisory Control and Data Acquisition system ("SCADA" system). The SCADA system can monitor and control a plant or equipment in industries such as telecommunications, water and waste control, energy, oil and gas refining, transportation. The SCADA system can gather information, such as where a leak on a pipeline has occurred, transfer the information back to a central site, alert a home station that the leak has occurred, carry out necessary analysis and control, such as determining if the leak is critical, and display the information in a logical and organized manner. The SCADA system can be simple, such as a system that monitors environmental conditions of a small office building, or complex, such as a system that monitors all activity in a nuclear power plant or a municipal water system.

As wind turbines and wind farms become more interconnected, larger, and/or more remote, providing performance-related information to an operator about one or more wind turbines or wind farms becomes more important. If the operator receives too little information, then the operator will not be aware of performance-related issues. If the operator receives too much information, then the operator will not be capable of adequately responding to performance-related issues. If the operator receives the information too late, then a trip event will likely occur. Addressing the performance-related issue prior to a trip event can increase overall efficiency of a wind turbine or wind turbine farm. Failure to monitor and control the wind turbines or wind farms can result in decreased efficiency or failure of the wind turbine or wind farm.

BRIEF DESCRIPTION OF THE INVENTION

In an exemplary embodiment, a computerized system for operating a plurality of wind turbines includes a supervisory control and data acquisition (SCADA) system and a display for depicting a graphical output of information from the SCADA system. In the embodiment, the SCADA system analyzes the information and transmits a signal to the display to visually depict the information in a dynamic manner.

In another exemplary embodiment, a wind turbine farm includes a plurality of wind turbines and a computerized system for operating the plurality of wind turbines. In the embodiment, at least one of the wind turbines includes at least one blade operably mounted on the wind turbine and attached to a rotor having a rotor shaft that is in communication with a generator, and the generator configured for converting torque into electrical power. Also, the computerized system includes a supervisory control and data acquisition (SCADA) system and a display for depicting a graphical output of information from the SCADA system. The SCADA system analyzes the information and transmits a signal to the display to visually depict the information in a dynamic manner.

In another exemplary embodiment, a method of monitoring and controlling a wind turbine farm includes acquiring information from one or more sensors positioned on one or more of a plurality of wind turbines, transmitting the information to a supervisory control and data acquisition (SCADA) system, and visually depicting the information in a dynamic manner. In the embodiment, the wind turbine farm includes the plurality of wind turbines, the SCADA system, and a display for depicting the graphical output of information from the SCADA system.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
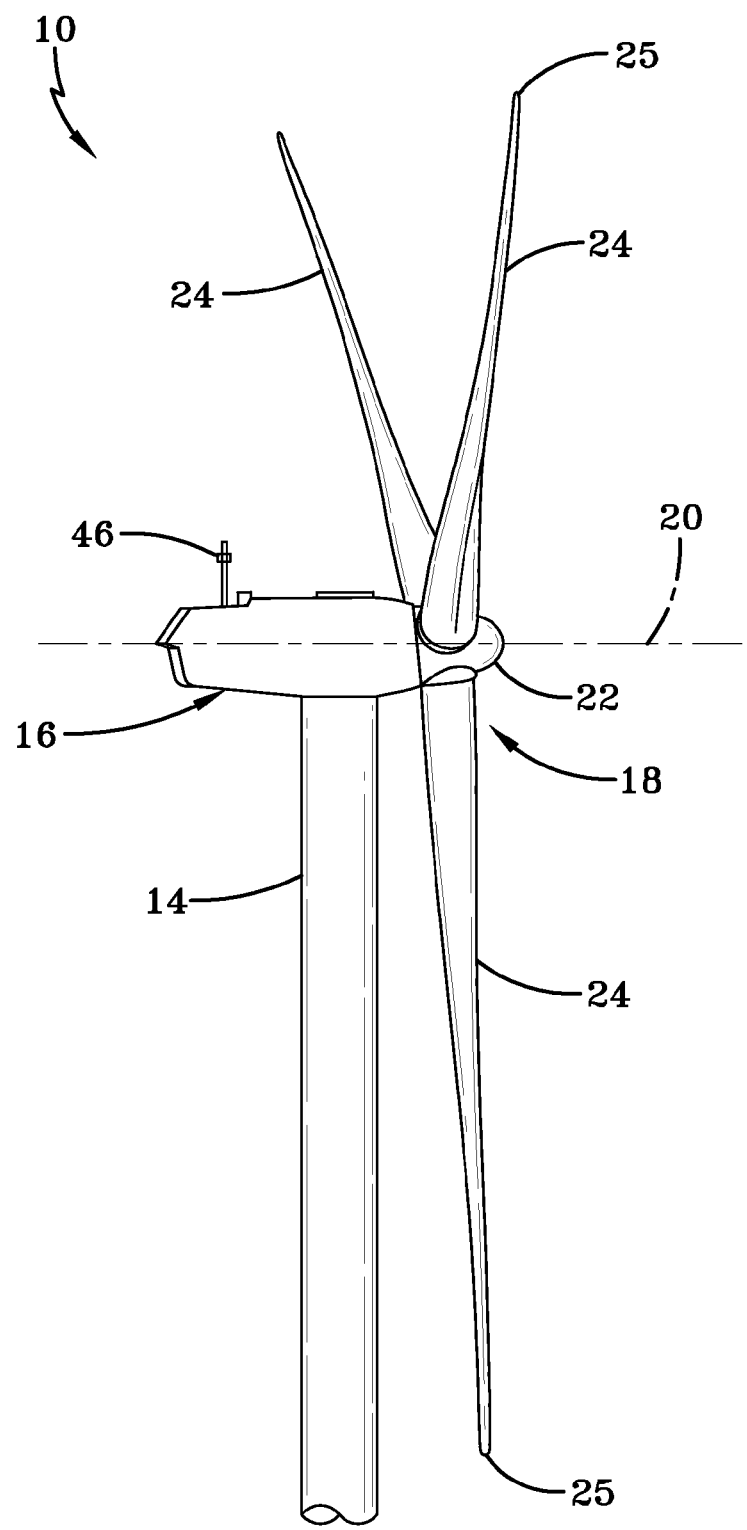
FIG. 1 is a perspective view of an exemplary embodiment of a wind turbine in accordance with the present disclosure.
Figure 2:
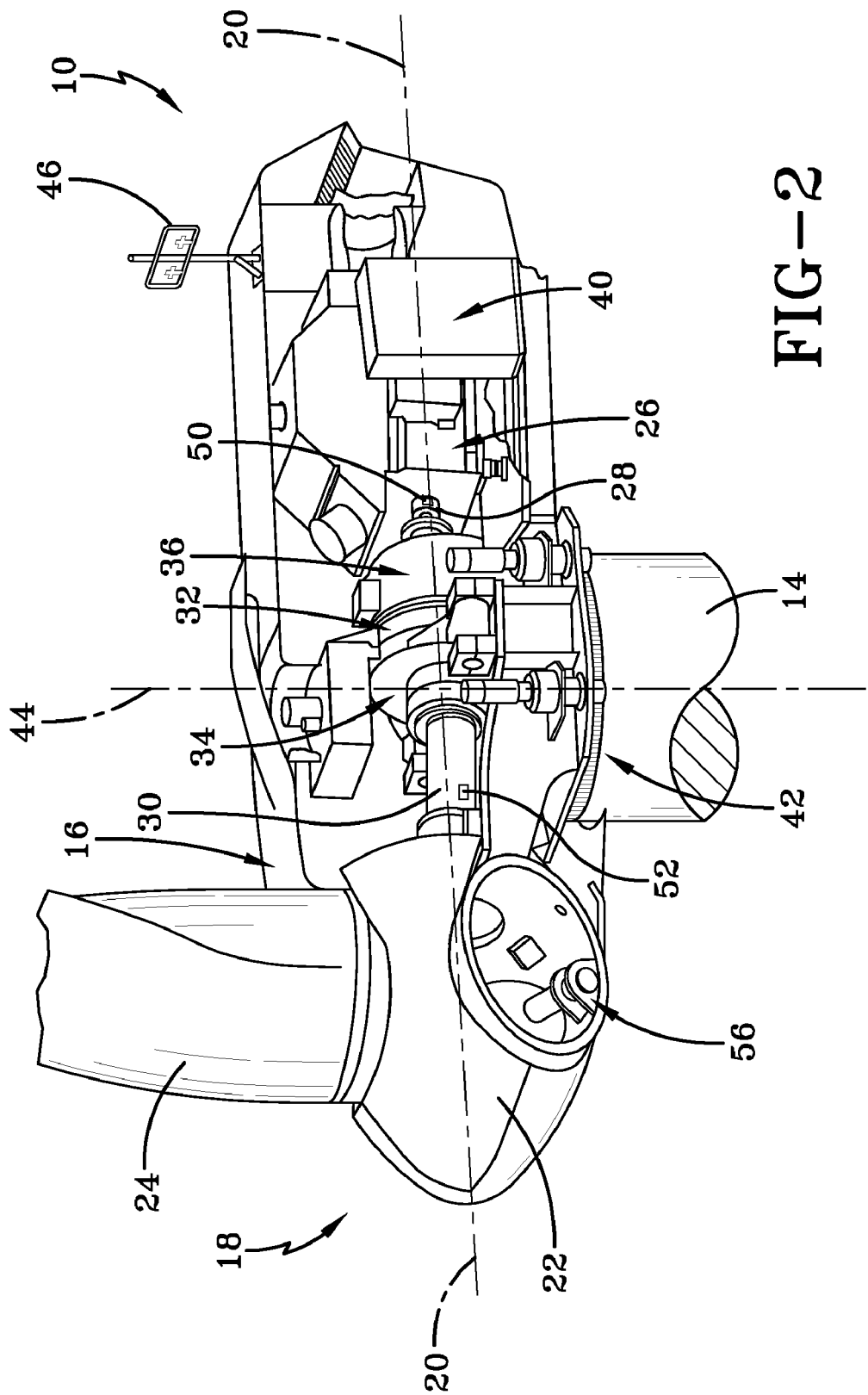
FIG. 2 is a partially cut-away perspective view of a portion of the wind turbine shown in FIG. 1 in accordance with the present disclosure.
Figure 3:
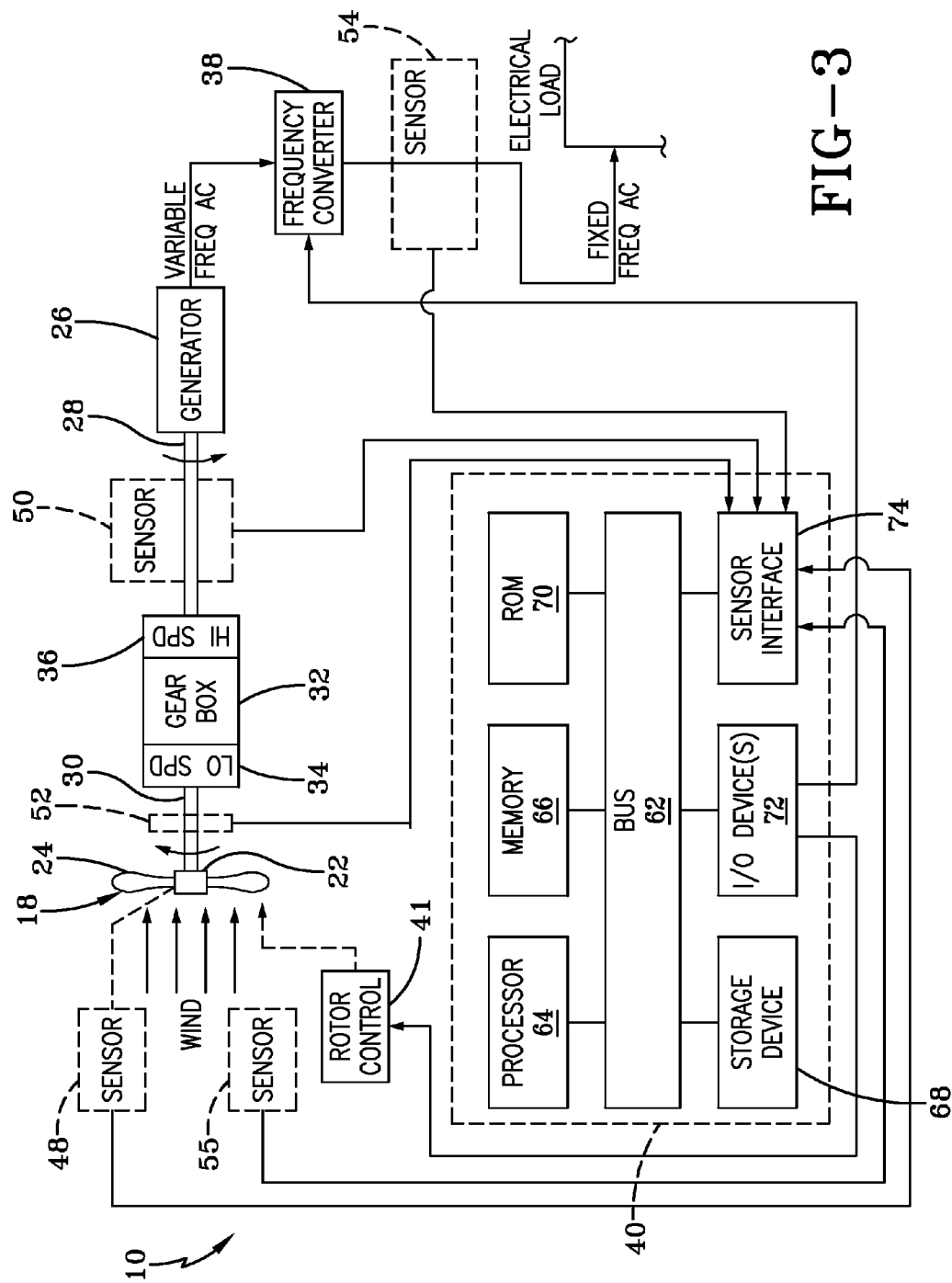
FIG. 3 is a schematic diagram of a wind turbine in accordance with the present disclosure.

FIG. 1 is a perspective view of an exemplary wind turbine 10 in accordance with an embodiment of the present disclosure. FIG. 2 is a partially cut-away perspective view of a portion of wind turbine 10 in accordance with an embodiment of the present disclosure. FIG. 3 is a schematic diagram of wind turbine 10. According to embodiments of the present disclosure a desired amount of performance-related information may be provided to an operator, trip events may be reduced by identifying performance-related issues, efficiency may be improved through the ability of an operator to comprehend more information through the use of graphical outputs, and/or there may be a reduction or elimination of instances of operators being misled by wind rose plots.

Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments a plurality of wind turbines 10 may be grouped together, sometimes referred to as a "wind farm".

Wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of a type, shape, and/or configuration of rotor blades 24 is a Darrieus wind turbine, sometimes referred to as an "eggbeater" turbine. Yet another example of a type, shape, and/or configuration of rotor blades 24 is a Savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine." In the exemplary embodiment, generator rotor shaft 28 is coupled to rotor shaft 28 through a gearbox 32, although in other embodiments generator rotor shaft 28 is coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14.

Wind turbine 10 includes one or more control systems 40 coupled to some or all of the components of wind turbine 10 for generally controlling operation of wind turbine 10 and/or some or all of the components thereof (whether or not such components are described and/or illustrated herein), and in particular for controlling the tip speed of the blades 24 to control the noise generated by the blades 24. For example, in the exemplary embodiment, control system(s) 40 are coupled to a rotor control 41 for generally controlling rotor 18. In the exemplary embodiment, control system(s) 40 is mounted within nacelle 16. However, additionally or alternatively, one or more control systems 40 may be remote from nacelle 16 and/or other components of wind turbine 10. Control system(s) 40 may be used for, but is not limited to, power generation monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44, for changing a yaw of rotor 18, and more specifically for changing a direction faced by rotor 18 to, for example, adjust an angle between the direction faced by rotor 18 and a direction of wind. Yaw system 42 may be coupled to control system(s) 40 for control thereby. In some embodiments, wind turbine 10 may include anemometry 46 for measuring wind speed and/or wind direction. Anemometry 46, in some embodiments, may be coupled to control system(s) 40 for sending measurements to control system(s) 40 for processing thereof. For example, although anemometry 46 may be coupled to control system(s) 40 for sending measurements thereto for controlling other operations of wind turbine 10, anemometry 46 may send measurements to control system(s) 40 for controlling and/or changing a yaw of rotor 18 using yaw system 42. Alternatively, anemometry 46 may be coupled directly to yaw system 42 for controlling and/or changing a yaw of rotor 18.

Wind turbine 10 may also include a plurality of sensors 48 (FIG. 3), each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to control system(s) 40 for sending pitch measurements to control system(s) 40 for processing thereof.

Wind turbine 10 may also include one or more sensors 50 coupled to generator rotor shaft 28 for measuring a speed of rotation of rotor shaft 28 and/or a torque of generator rotor shaft 28. Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof.

Wind turbines 10 may also include one or more sensors 52 coupled to rotor shaft 30 for measuring a speed of rotation of generator shaft 28 and/or a torque of rotor shaft 30. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to control system(s) 40 for sending measurements to control system(s) 40 for processing thereof.

Wind turbines 10 may also include one or more sensors 54 (FIG. 3) coupled to generator 26 for measuring an electrical power output of generator 26. In some embodiments, sensor(s) 54 are coupled to control system(s) 40 for sending measurements to control system(s) 40 for processing thereof. Sensor(s) 54 may be any suitable sensor having any suitable location within or remote to wind turbine 10, such as, but not limited to, Hall effect current transducers (CTs) and/or capacitive voltage transducers (CVTs).

Wind turbines 10 may also include one or more sensors 55 (FIG. 3) coupled to control system(s) 40 for sending measurements to control system(s) 40 for processing thereof. Sensors 55 may be any suitable sensor having any suitable location within or remote to wind turbine 10, such as, but not limited to, anemometers.

Wind turbine 10 may also include one or more other sensors (not shown) coupled to one or more components of wind turbine 10 and/or the electrical load, whether or not such component(s) are described or illustrated herein, for measuring parameters of such component(s). Such other sensor(s) may include, but are not limited to, sensors configured to measure displacements, yaw, pitch, movements, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether or not such component, location, and/or parameter is described and/or illustrated herein.

Wind turbine 10 includes a variable blade pitch system 56 for controlling, including but not limited to changing, a pitch angle of rotor blades 24 (shown in FIGS. 1-3) in response to a condition such as wind speed.

Referring again to FIG. 3, in some embodiments, control system(s) 40 include a bus 62 or other communications device to communicate information. One or more processor(s) 64 are coupled to bus 62 to process information, including information from anemometry 46, sensors 48, 50, 52, 54 and/or 55, and/or other sensor(s). Control system(s) 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Control system(s) 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

Control system(s) 40 can operate in conjunction with a supervisory control and data acquisition (SCADA) system to dynamically monitor and control wind turbine(s) 10 or wind farm(s). The SCADA system includes a Human-Machine Interface (HMI), a supervisory (computer) system, Remote Terminal Units (RTUs), and a communication infrastructure. The HMI is an apparatus which presents performance-related information to the operator. By using the HMI, the operator can monitor and/or control operation of wind turbine(s) 10 and/or wind farm(s). The supervisory system monitors wind turbine(s) 10 and/or wind farm(s) by gathering and/or acquiring information (in the form of data). Also, the supervisory system controls wind turbine(s) 10 and/or wind farm(s) by transmitting commands to wind turbine(s) 10 and/or wind farm(s). The RTUs receive signals from anemometry 46, sensors 48, 50, 52, 54 and/or 55, and/or other sensor(s), convert the signals into digital data, and transmit the digital data to the supervisory system via the communication infrastructure (for example, optical fibers).

The SCADA system acts as a "nerve center" for wind turbine(s) 10 and/or wind farm(s). The SCADA system continuously analyzes the performance-related information and transmits signals to the HMI so that the performance-related information is visually depicted in a dynamic manner. The SCADA system can monitor and/or control wind turbine(s) 10 and wind farm(s), one or more substations (not shown), and one or more meteorological stations (not shown) thus allowing the operator to cohesively monitor and/or control wind turbine(s) 10 at a specific location, a wind farm, or any other suitable grouping of wind turbines 10. The SCADA system stores periodic records throughout a given period of time. The periodic records can be based upon activity at the specific location, the wind farm, or any other suitable grouping of wind turbines 10. The periodic records can be analyzed to provide the operator with performance-related information. The performance-related information can be used for implementing corrective action. The SCADA system implements requirements based upon connection agreements to control reactive power production, to contribute to network voltage or frequency control, or to limit power output in response to instructions from a network operator.

The technical effect of the SCADA system is to provide basic displays for the operator and dynamic displays 80 for the operator. The basic displays include intuitive tools for operation and maintenance of wind turbine(s) 10 and/or wind farm(s). For example, the basic display may include production reports regarding wind turbine monitoring and control, a visual representation identifying the mode of wind turbine(s) 10 and/or wind farm(s), wind farm power and/or wind speed as a recent time plot of wind speed and generated power, and/or a visual representation identifying the status of wind turbine(s) 10 and/or wind farm(s) superimposed on a detailed geographical map. The basic displays may be available through specific applications. For example, a viewer application may provide information relating to operation and maintenance of wind turbine(s) 10 and/or wind farms(s). The viewer application may be available on-site or remotely. The remote access to the viewer application may be through an internet connection, a telephone line, a satellite signal, a radio signal, or any other suitable communication method. The communication method may be secure by any suitable measure(s). Suitable measure(s) may be encryption of any signal (for example, 40 bit encryption, 128 bit encryption, 256 bit encryption, etc.), recording all executed activity as an audit trail, limiting access to predetermined applications and/or functions of the SCADA system, or other suitable measures.

Figure 4:
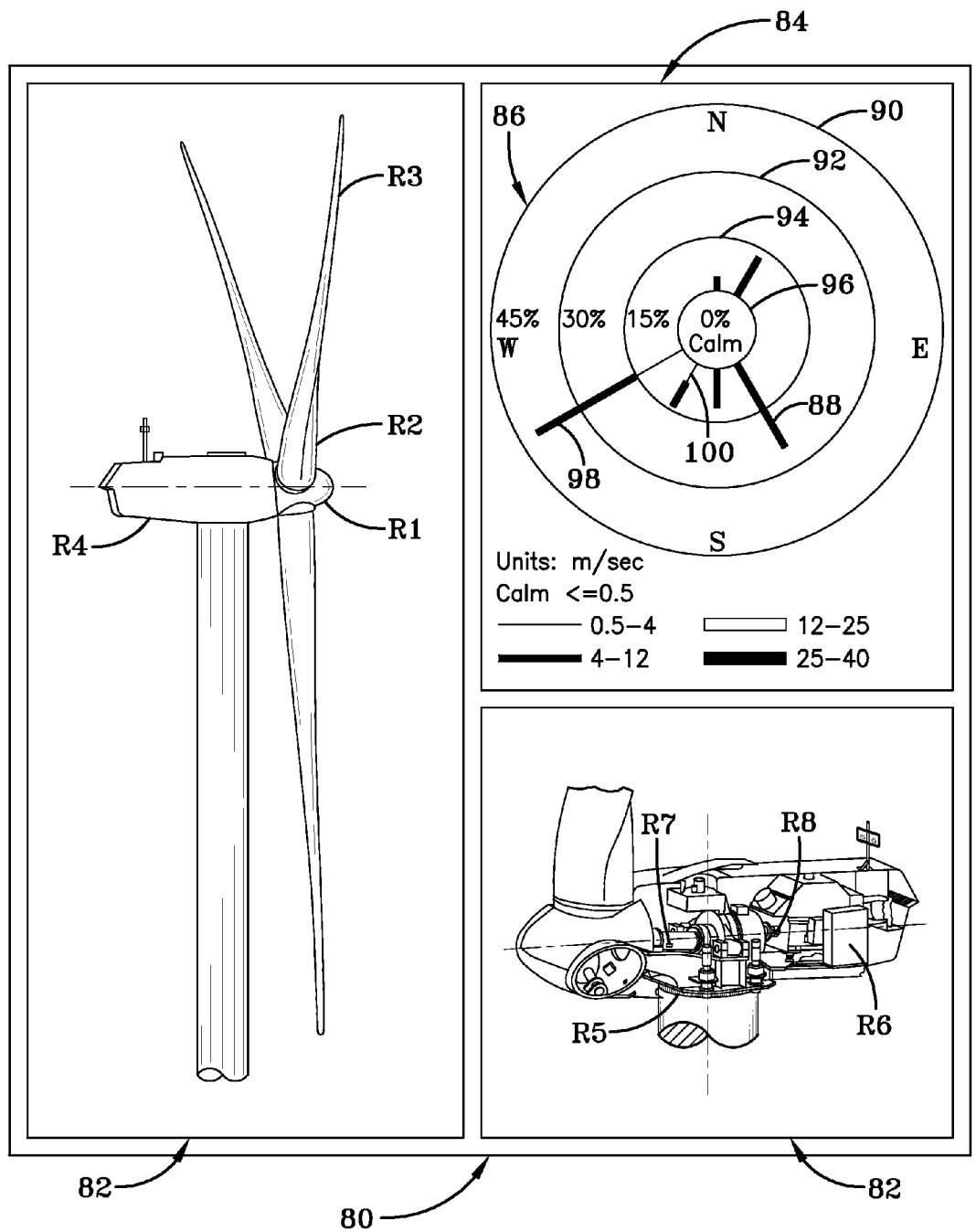
FIG. 4 is a schematic screen shot of a visual display of a computerized system in accordance with the present disclosure.

FIG. 4 is an exemplary dynamic display 80 generated by the SCADA system(s). Dynamic display 80 can be one or more HMI of the SCADA system(s) and/or be in communication with one or more HMI of the SCADA system(s). Dynamic display 80 visually depicts performance-related information regarding components of wind turbine(s) 10 (for example, display 82) and/or wind farm(s) and/or visually depicts one or more wind rose plots with enhanced visualization to avoid misleading the operator (for example, display 84). Dynamic display 80 depicts performance-related information about wind turbine(s) 10 or wind turbine farm(s) to an operator. Dynamic display 80 permits the operator to respond to the performance-related information by providing a desired amount of information (i.e., sufficient information to make operation-oriented control decisions) and/or a desired format (for example, an accurate color coded component depiction and/or an enhanced wind rose plot). Additionally or alternatively, dynamic display 80 permits the operator to respond to the performance-related information prior to a trip event.

Display 82 visually depicts performance-related information regarding components of wind turbine(s) 10 and/or wind farm(s). Display 82 utilizes various colors to represent the performance-related information regarding the components. Different colors or tiers of colors display different component states, thereby providing the operator with valuable information for resolving performance-related issues. The performance-related information may relate to blade(s) 24 (for example, from sensor 48), yaw system(s) 42 (for example, from control system(s) 40), drive train (for example, based on information regarding rotor 30 provided by sensor 52), generator(s) 26 (for example, from sensors 50, 54), or other suitable components. Additionally or alternatively, the performance-related information may relate to damage, fatigue, other structural abnormalities.

The performance-related information may be visually depicted on images of wind turbine(s) 10 or wind farm(s) or images of portions of wind turbine(s) 10 or wind farm(s) within display 82. In one embodiment, the visual depiction may include regions corresponding to specific components (for example, R5, R6, R7, and R8 in FIG. 4). In another embodiment, the visual depiction may include regions including several components (for example, R1, R2, R3, and R4 in FIG. 4). For example, the regions may be displayed as green, yellow, or red based upon the condition of the respective region. In one embodiment, the color green may indicate that the region is stable or good, the color yellow may indicate that the region is at risk of failure or otherwise should be addressed, and/or the color red may indicate that the region has failed or is about to fail. Other colors and indicators may be used to indicate the performance-related information, status, or relative status of a component, sub-assembly, wind turbine(s) 10, and/or wind farm(s). In one embodiment, the relative status may provide comparative information for determining whether the component, the sub-assembly, wind turbine(s) 10, and/or wind farm(s) is in a condition worse than the other components, sub-assemblies, wind turbine(s) 10, and/or wind farm(s).

The display 82 may be accessed via a drop down menu in the SCADA system(s). The drop down menu or other selection list may permit individual visual inspection of the component, the sub-assembly, wind turbine(s) 10, and/or wind farm(s) by limiting the display based upon selected criteria and/or may permit aggregate inspection of the component, the sub-assembly, wind turbine(s) 10, and/or wind farm(s) by limiting the display based upon alternately selected criteria. In one embodiment, display 82 includes no text regarding the performance-related information and is entirely represented by colors. In another embodiment, display 82 includes limited text regarding the performance-related information and is substantially represented by colors.

Display 84 visually depicts one or more wind rose plots 86 with enhanced visualization to avoid misleading the operator. Wind rose plot 86 is a graphical tool showing a succinct but information-laden view of wind speed and wind direction distribution at a predetermined location. Wind rose plot 86 may display data specific to wind direction and wind speed for wind turbine(s) 10 and/or wind farm(s). Wind rose plot 86 is data-dependent by representing the dynamic frequency/percentage of data collected, being substantially devoid of static frequency/percentage of that displayed, and/or being dependent upon the sector and/or quadrant. Wind rose plot 86 can be depicted with four cardinal directions (North, South, East, and West), sixteen directions, thirty-two directions, or any other suitable number of directions. For example, referring to FIG. 5, the exemplary data shown in Table 1 may represent the four cardinal quadrants as plotted in the wind rose plot of FIG. 5.

TABLE 1

| SECTOR | SPEED GROUP | COUNT | PERCENT |
|---|---|---|---|
| N | 0-0.5 | 20 | 4.71% |
| N | 0.5-4 | 25 | 5.88% |
| N | 4-8 | 10 | 2.35% |
| N | 8-12 | 12 | 2.82% |
| N | 12-25 | 15 | 3.53% |
| E | 0-0.5 | 0 | 0.00% |
| E | 0.5-4 | 0 | 0.00% |
| E | 4-8 | 1 | 0.24% |
| E | 8-12 | 40 | 9.41% |
| E | 12-25 | 20 | 4.71% |
| S | 0-0.5 | 0 | 0.00% |
| S | 0.5-4 | 3 | 0.71% |
| S | 4-8 | 25 | 5.88% |
| S | 8-12 | 40 | 9.41% |
| S | 12-25 | 15 | 3.53% |
| W | 0-0.5 | 120 | 28.24% |
| W | 0.5-4 | 12 | 2.82% |
| W | 4-8 | 32 | 7.53% |
| W | 8-12 | 25 | 5.88% |
| W | 12-25 | 10 | 2.35% |

Figure 5:
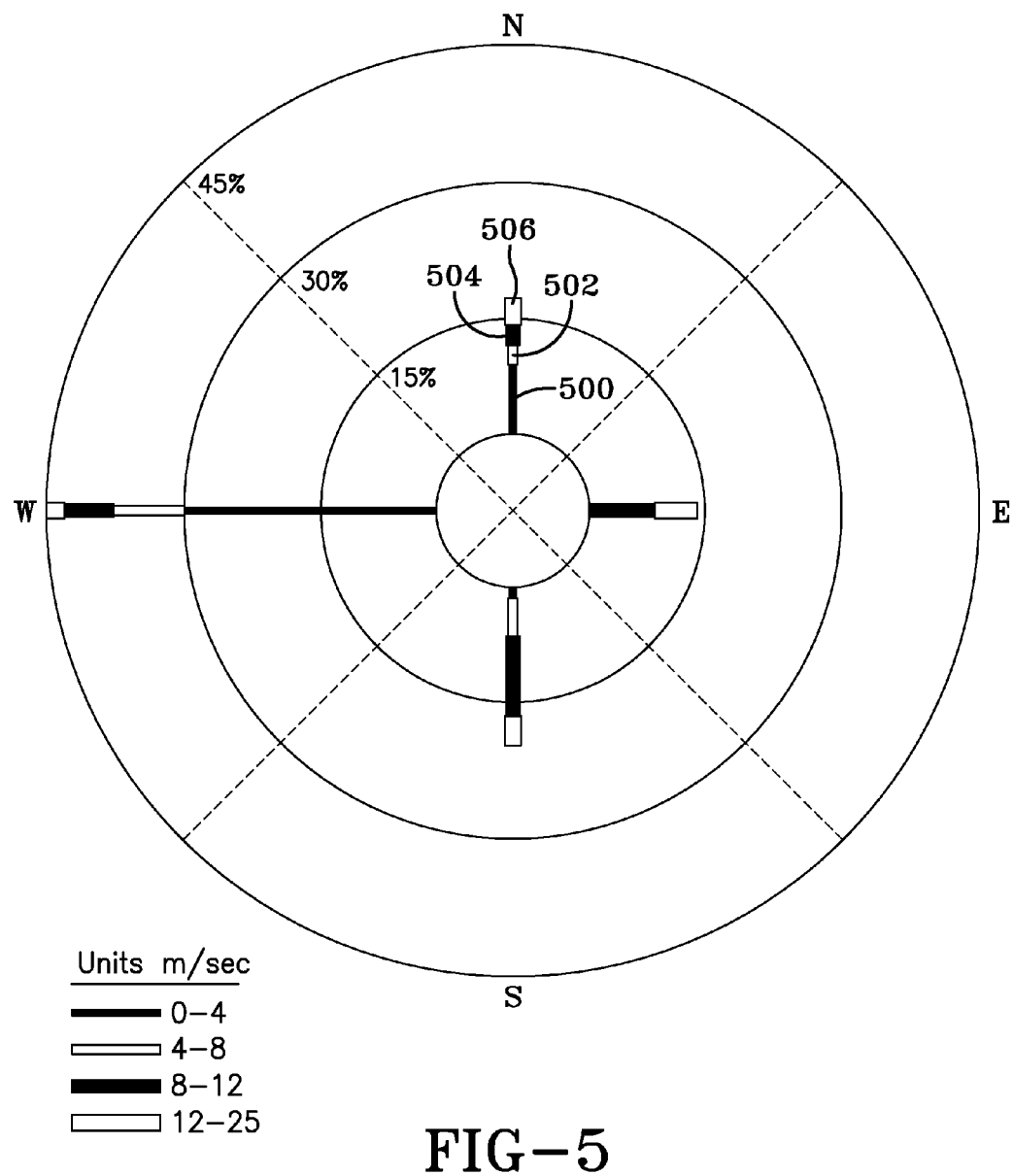
FIG. 5 is an exemplary wind rose plot in accordance with an embodiment of the present disclosure.

By way of example, FIG. 5 shows a first set of data 500 in the North quadrant corresponding to the 45 measurements between 0 and 4 m/s. Thus, data 500 shows a rectangle extending to a point representing about 11.5%. A second set of data 502 in the North quadrant corresponds to the 10 measurements between 4 and 8 m/s. Thus, data 502 shows a rectangle extending to a point representing about 2.3%. A third set of data 504 in the North quadrant corresponds to the 12 measurements between 8 and 12 m/s. Thus, data 504 shows a rectangle extending to a point representing about 2.8%. A fourth set of data 506 in the North quadrant corresponds to the 15 measurements between 12 and 25 m/s. Thus, data 506 shows a rectangle extending to a point representing about 3.5%. Data in the East, South, and West quadrants are similarly represented by FIG. 5.

Presented in a circular format, wind rose plot 86 shows the frequency of wind blowing from various directions through spokes 88. The length of each spoke 88 is related to the frequency that the wind blows from a particular direction during a period of time. As each spoke 88 crosses concentric circles 90, 92, 94, 96 a percentage during the period of time that the wind blows from the particular direction is represented. Spoke 88 may include visual representations of additional information. For example, spoke 88 may be color-coded to represent wind speed ranges.

Spokes 88 can represent entire sectors or quadrants corresponding to the number of directions. For example, if the depiction of wind rose plot 86 is limited to sectors or quadrants corresponding to the four cardinal directions, then the overall wind speed may be represented by up to four spokes 88. Each of the four spokes 88 may represent data corresponding to wind speed in a specific quadrant. For example, spoke 88 in the North direction may include data corresponding to the wind speed measured between the North-West direction and the North-East direction. Similarly, spoke 88 in the South direction may include data corresponding to the wind speed measured between the South-West direction and the South-East direction. Spoke 88 may include data corresponding to the wind speed measured within any other suitable quadrant or sector.

In contrast to wedge-like plots, spokes 88 may maintain a desired thickness throughout wind rose plot 86. Such maintaining of the desired thickness may avoid misleading operators that otherwise may believe that the large exterior portion of the wedge-like plot signifies an increase in data values collected. Additionally, maintaining a desired thickness of the spokes 88 and/or a desired slope of changing thickness may represent other performance-related information. For example, wind rose plot 86 may include a first predetermined thickness 98 corresponding to a first predetermined wind speed range, a second predetermined thickness 100 corresponding to a second predetermined wind speed range, or any number of predetermined thicknesses corresponding to respective wind speed ranges. Additionally, the length of a portion of spoke 88 having a predetermined thickness may correspond to additional data, for example, a ratio of wind in the direction of spoke 88 at a predetermined speed.

While the disclosure has been described with reference to a preferred embodiment, it will be understood by those skilled in the art that various adjustments may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A computerized system for operating at least one wind turbine, comprising:
   a supervisory control and data acquisition (SCADA) system; and
   a display for depicting a graphical output of information for the at least one wind turbine from the SCADA system, wherein the graphical output of information includes performance-related information visually depicted as images corresponding to wind turbines or wind turbine components on the display, wherein the visually depicted images include a color to indicate a status of the image, and the display includes a data-dependent wind rose plot, wherein data is visually displayed as a spoke originating from a center portion of the wind rose plot, the spoke having a length representing frequency of direction of wind and the spoke having a thickness representing wind speed range; and,
   wherein the SCADA system analyzes conditions for the at least one wind turbine and transmits a signal to the display to visually depict the color representing status of the wind turbine or wind turbine component related to the performance-related information in a dynamic manner.

2. The computerized system of claim 1, wherein the wind speed at each turbine is visually represented on the data-dependent wind rose plot.

3. The computerized system of claim 1, wherein the data-dependent wind rose plot represents dynamic frequency of data collected and is substantially devoid of static frequency.

4. The computerized system of claim 3, wherein the data-dependent wind rose plot represents data in a predetermined sector of the data-dependent wind rose plot.

5. A wind turbine farm, comprising:
   a plurality of wind turbines, at least one of the plurality of wind turbines comprising:
      at least one blade operably mounted on a wind turbine, the at least one blade attached to a rotor having a rotor shaft, the rotor shaft in communication with a generator;
      the generator configured for converting torque into electrical power; and,
   a computerized system for operating the plurality of wind turbines, comprising:
      a supervisory control and data acquisition (SCADA) system; and,
      a display for depicting a graphical output of information for the at least one wind turbine from the SCADA system, wherein the graphical output of information includes performance-related information visually depicted on the display as images corresponding to wind turbines or wind turbine components, wherein the visually depicted images include a color to indicate a status of the image, and the display includes a data-dependent wind rose plot, wherein data is visually displayed as a spoke originating from a center portion of the wind rose plot, the spoke having a length representing frequency of direction of wind and the spoke having a thickness representing wind speed range;
      wherein the SCADA system analyzes conditions for the at least one wind turbine and transmits a signal to the display to visually depict the color representing status of the wind turbine or wind turbine component related to the performance-related information in a dynamic manner.

6. The wind turbine farm of claim 5, wherein the wind speed at each turbine is visually represented on the data-dependent wind rose plot.

7. The wind turbine farm of claim 5, wherein the data-dependent wind rose plot represents dynamic frequency of data collected and is substantially devoid of static frequency.

8. The wind turbine farm of claim 7, wherein the data-dependent wind rose plot represents data in a predetermined sector of the data-dependent wind rose plot.

9. A method of monitoring and controlling a wind turbine farm, the wind turbine farm having a plurality of wind turbines, a supervisory control and data acquisition (SCADA) system, and a display for depicting a graphical output of information for the plurality of wind turbines from the SCADA system, wherein the graphical output of information includes performance related information visually depicted as images corresponding to wind turbines or wind turbine components, wherein the visually depicted images include a color to indicate a status of the image, and the display includes a data-dependent wind rose plot, wherein data is visually displayed as a spoke originating from a center portion of the wind rose plot, the spoke having a length representing frequency of direction of wind and the spoke having a thickness representing wind speed range, the method comprising:
    acquiring information from one or more sensors positioned on one or more of the plurality of wind turbines;
    transmitting the information from the sensors to the SCADA system;
    analyzing information from the sensors with the SCADA system, and
    transmitting a signal to the display to visually depict the color representing status of the wind turbine or wind turbine component related to the performance-related information in a dynamic manner and performing visual display using the display.

\* \* \* \* \*